May 2, 1967     T. WILLIAMS     3,316,615
MACHINE TOOL
Filed April 30, 1965
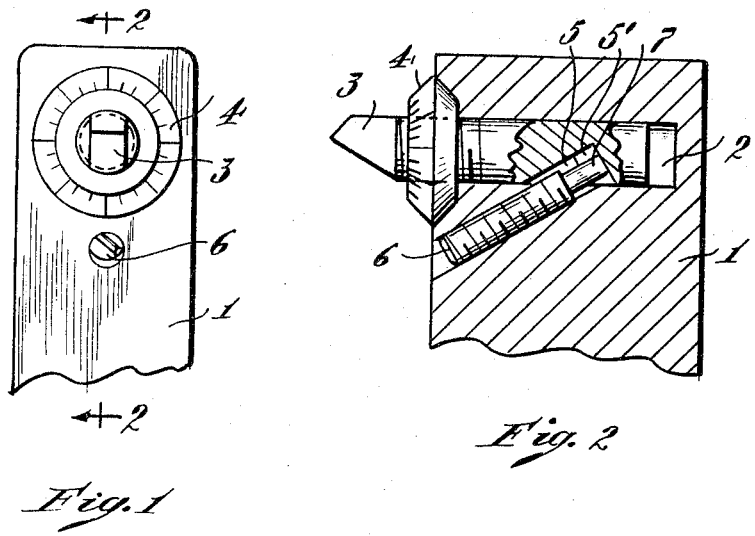
Fig. 1
Fig. 2
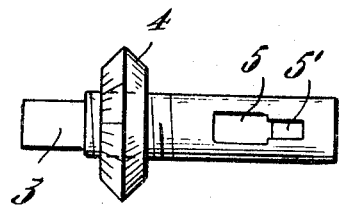
Fig. 3
INVENTOR.
Thurston Williams
BY
Roberts, Cushman & Grover
ATT'YS United States Patent Office 3,316,615
Patented May 2, 1967

3,316,615
MACHINE TOOL
Thurston Williams, Wilton, N.H. (% The O.K. Tool Co., Inc., Milford, N.H. 03055)
Filed Apr. 30, 1965, Ser. No. 452,197
1 Claim. (Cl. 29—96)

This invention relates to boring tools, facing tools and the like and its objects are to produce a tool which is simple and economical in construction, which can be formed with facility, which can be adjusted quickly and easily from the front and which is durable and reliable in use.

According to this invention the tool comprises a carrier having a bore in its front face and a second bore intersecting the first bore at an oblique angle, in the first bore a holder for a cutting edge projecting from said face, a stop to limit the extent to which the holder extends into its bore, said stop being adjustable longitudinally of its bore to regulate the extent to which the cutting edge projects beyond said face, one side of the holder having a recessed shoulder facing the inner end of said second bore, and in said second bore an adjustable lock bearing on said shoulder to lock the holder in adjusted position. By using recesses in the form of bores, they can be drilled quickly and easily. While the aforesaid holder preferably comprises a bit it may comprise a support for a bit. The aforesaid stop is preferably threaded on the forward end of the bit or other holder and the aforesaid lock preferably comprises a screw threaded into the second bore. The second bore should extend through said front face so that the lock can be actuated from the front of the tool.

For the purpose of illustration a preferred embodiment of the invention is shown in the accompanying drawings in which:

FIG. 1 is a front view;
FIG. 2 is a section on line 2—2 of FIG. 1; and
FIG. 3 is a side elevation of the bit and stop viewed from the bottom of FIGS. 1 and 2.

The particular embodiment of the invention chosen for the purpose of illustration comprises a carrier 1 having a bore 2 to receive a boring bit 3 carrying a nut 4 and having a groove comprising a large part 5 and a small part 5'. Extending into the front face of the carrier 1 obliquely to the bore 2 is a bore into which is threaded a screw 6 with a nose 7 seating on the bottom of the groove 5'. The threaded portion of the screw extends into the wider portion 5 of the groove and the narrower portion of the groove is only slightly larger than the diameter of the nose 7. Thus the screw 6 not only holds the bit 3 in the bore 2 but it prevents the bit from turning. To adjust the extent to which the bit projects from the carrier 1 the screw 6 is loosened, the nut 4 is turned the right amount and the screw 6 is again tightened.

One advantage of the present invention consists in that the extent to which the bit 3 extends from the carrier 1 can be adjusted from the front of the carrier and the lock screw 6 can also be adjusted from the front. Thus it is unnecessary for the operator to go to the back or side of the carrier to adjust the bit and lock it in adjusted position.

It should be understood that the present disclosure is for the purpose of illustration only and that this invention includes all modifications and equivalents which fall within the scope of the appended claim.

I claim:

A tool comprising a carrier having a bore in its front face and a second bore intersecting the first bore at an oblique angle, in the first bore a holder for a cutting edge projecting from said face, a stop to limit the extent to which the holder extends into its bore, said stop being adjustable longitudinally of the holder to regulate the extent to which the cutting edge projects beyond said face, one side of the holder having a recess with a bottom shoulder facing the inner end of said second bore, in said second bore an adjustable lock bearing on said shoulder to lock the holder in its bore, said recess also having side shoulders abutting opposite sides of said lock to prevent rotation of the holder in its bore, and said stop comprising a ring threaded on the outer end of the holder, the stop and ring being disposed on the same side of the carrier so that they can be adjusted concomitantly.

References Cited by the Examiner

UNITED STATES PATENTS 2,775,149   12/1956   Thomas.
3,073,186   1/1963   Flannery.

FOREIGN PATENTS 318,815   2/1920   Germany.
600,346   4/1948   Great Britain.

OTHER REFERENCES

American Machinist Magazine article, "Improved Types of Boring Bars and Heads," Sept. 11, 1913 issue, p. 447.

WILLIAM W. DYER, JR., *Primary Examiner.*

HARRISON L. HINSON, *Examiner.*